United States Patent
Zhang et al.

(10) Patent No.: US 10,347,943 B2
(45) Date of Patent: Jul. 9, 2019

(54) FLUORO-SUBSTITUTED ETHERS AND COMPOSITIONS

(71) Applicant: UCHICAGO ARGONNE, LLC, Chicago, IL (US)

(72) Inventors: Zhengcheng Zhang, Naperville, IL (US); Chi Cheung Su, Westmont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 317 days.

(21) Appl. No.: 15/265,603

(22) Filed: Sep. 14, 2016

(65) Prior Publication Data

US 2018/0076485 A1    Mar. 15, 2018

(51) Int. Cl.
| | |
|---|---|
| H01M 10/0569 | (2010.01) |
| H01M 4/38 | (2006.01) |
| H01M 4/62 | (2006.01) |
| H01M 10/0568 | (2010.01) |
| H01M 10/0567 | (2010.01) |

(52) U.S. Cl.
CPC ......... *H01M 10/0569* (2013.01); *H01M 4/38* (2013.01); *H01M 4/382* (2013.01); *H01M 4/623* (2013.01); *H01M 4/625* (2013.01); *H01M 10/0567* (2013.01); *H01M 10/0568* (2013.01); *H01M 2300/0034* (2013.01)

(58) Field of Classification Search
CPC ......... H01M 10/0569; H01M 10/0567; H01M 10/0568; H01M 4/382; H01M 4/38; H01M 4/623; H01M 4/625; H01M 2300/0034
See application file for complete search history.

(56) References Cited

U.S. PATENT DOCUMENTS

| | | | | |
|---|---|---|---|---|
| 5,916,708 | A * | 6/1999 | Besenhard | H01M 6/164 429/199 |
| 6,566,015 | B1 * | 5/2003 | Yamada | C07D 295/02 429/199 |
| 2007/0054186 | A1 * | 3/2007 | Costello | H01M 10/0568 429/200 |
| 2016/0204471 | A1 | 7/2016 | Nakamoto et al. | |

OTHER PUBLICATIONS

Gordin et al. Bis(2,2,2-trifluoroethyl) Ether As an Electrolyte Co-solvent for Mitigating Self-Discharge in Lithium-Sulfur Batteries ACS Applied Materials & Interfaces 2014, 6 (11), 8006-8010.*
Burke, C.M. et al., Enhancing Electrochemical Intermediate Solvation Through Electrolyte Anion Selection to Increase Nonaqueous Li—O2 Battery Capacity, Research Paper.
Li, G. et al., Developments of Electrolyte Systems for Lithium-Sulfur Batteries: A Review, Frontiers in Energy Research 3 (5), 1-12 (2015).
Li, Q. et al., Progress in Electrolytes for Rechargeable Li-Based Batteries and Beyond, Green Energy & Environment, 1-25 (2016).
Suo, L. et al., A New Class of Solvent-in-Salt Electrolyte for High-Energy Rechargeable Metallic Lithium Batteries, Nature Communications, 4:1481, 1-9 (2013).
Tang, S. et al., Glymes as Versatile Solvents for Chemical Reactions and Processes: From the Laboratory to Industry, RSC Adv. 4 (22), 11251-11287 (2014).
Younesi, R. et al., Lithium Salts for Advanced Lithium Batteries: Li-Metal, LiO2, and Li—S, Energy & Environmental Science 8, 1905-1922 (2015).
Zhong, H. et al., A Novel Quasi-Solid State Electrolyte With Highly Effective Polysulfide Diffusion Inhibition for Lithium-Sulfur Batteries, Scientific Reports 6:25484, 1-7 (2016).

* cited by examiner

*Primary Examiner* — Laura Weiner
(74) *Attorney, Agent, or Firm* — Olson & Cepuritis, Ltd.

(57) ABSTRACT

Described herein are fluoro-substituted ethers of Formula (I):

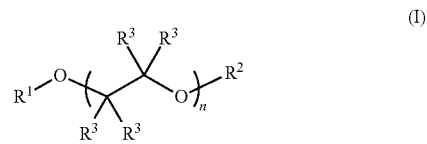

wherein $R^1$ is a fluoro-substituted $C_2$-$C_6$ alkyl group; $R^2$ is a $C_2$-$C_6$ alkyl group or a fluoro-substituted $C_2$-$C_6$ alkyl group; each $R^3$ independently is H, F, methyl, or fluoro-substituted methyl; and n is 0, 1, 2, 3, or 4. The fluoro-substituted ether compounds are useful as solvents for lithium containing electrolytes in lithium batteries, particularly lithium-sulfur batteries.

13 Claims, 9 Drawing Sheets

FLUORO-SUBSTITUTED ETHERS AND COMPOSITIONS

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to fluoro-substituted ethers and electrolytes for lithium batteries comprising the ethers, particularly non-aqueous electrolytes for lithium-sulfur batteries.

BACKGROUND OF THE INVENTION

The lithium-sulfur (Li—S) battery has recently attracted attention due to its potential to meet the performance requirements for high-energy-density batteries in emerging electronics and vehicle applications. Sulfur is a naturally abundant element, nontoxic, and one of the cheapest energy storage materials available, with an extremely high capacity of about 1675 mAh/g. In a Li—S cell, sulfur is electrochemically reduced to polysulfide intermediates through a multistep process, in which longer chain polysulfides present in sulfur tend to dissolve in organic electrolytes commonly used in lithium battery applications, which is undesirable. Insoluble discharge products, such as $Li_2S_2$ and $Li_2S$, also are generated through the reduction reactions at the final step. During the charging step, $Li_2S/Li_2S_2$ is converted to elemental sulfur through the multiple oxidation steps.

The dissolution of the intermediate lithium polysulfides during cycling causes a severe redox shuttling effect and rapid capacity fading, which are the main obstacles for commercialization of Li—S batteries. A firm understanding of the operation mechanism of the Li—S battery and the technical solution to solve these issues are in great demand in order to successfully develop Li—S batteries for commercial application. Much research has been undertaken to overcome these problems. One approach was to introduce porous carbon materials into the cathode to trap lithium polysulfides within the cathode during cycling by the strong adsorption property of carbon. Another approach was to form a protective layer on the lithium anode surface to mitigate the redox reaction of the dissolved polysulfides and lithium metal. Yet another approach was the development of new solid state electrolytes including ionic liquids, tetra(ethylene glycol) dimethyl ether as organic solvents for the electrolyte, lithium salt electrolytes, and functional electrolyte additives to prevent the dissolution of the polysulfides into the organic electrolyte and thereby avoid the redox shuttling effect. While these approaches can improve the Li—S performance to some extent, there is an ongoing need for new electrolyte compositions for Li—S batteries. The compositions described herein address this need,

SUMMARY

A new class of solvents useful for lithium batteries, and particularly Li—S batteries, are based on fluoro-substituted ethers (e.g., fluoro-substituted glycol ethers). An electrolyte comprising a lithium salt, such as lithium bis(trifluoromethanesulfonyl) imide (LiTFSI) and a fluoro-substituted ether solvent can provide improved Li—S battery performance in terms of capacity, capacity retention and Coulombic efficiency relative to conventional electrolytes for Li—S batteries. In particular, polysulfide dissolution can be suppressed when this new electrolyte is used a Li—S battery, and the cycle life and coulombic efficiency is greatly improved.

Fluoro-substituted ethers described herein are compounds of Formula (I):

wherein $R^1$ is a fluoro-substituted $C_2$-$C_4$ alkyl group; $R^2$ is a $C_2$-$C_6$ alkyl group (e.g., ethyl, n-propyl, isopropyl, n-butyl, n-pentyl, and the like) or a fluoro-substituted $C_2$-$C_6$ alkyl group; each $R^3$ independently is H, F, methyl, or fluoro-substituted methyl (e.g., trifluoromethyl); and n is 0, 1, 2, 3, or 4. In some preferred embodiments the compounds are fluoro-substituted glycol ethers, i.e., n is 1, 2, 3, or 4. Preferably, the fluoro-substituted $C_2$-$C_6$ alkyl group comprises a plurality of fluoro substituents, e.g., such as —$CH_2CF_3$, —$CH_2CF_3$, —$CH_2CF_2CF_3$, —$CH_2CF_2CF_2CF_3$, —$CH(CF_3)_2$, and —$CF_2CF_2H$. In some preferred embodiments, one or more $R^3$ group is H, more preferably all of the $R^3$ groups are H. In some embodiments, the alkyl and fluoro-substituted alkyl group $C_2$-$C_6$ alkyl or fluoro-substituted alkyl. An electrolyte composition for a lithium ion battery, such as a Li—S battery, comprises a lithium salt dissolved in a solvent comprising a fluoro-substituted ether of Formula (I):

wherein $R^1$ is a fluoro-substituted $C_2$-$C_4$ alkyl group; $R^2$ is a $C_2$-$C_6$ alkyl group or a fluoro-substituted $C_2$-$C_6$ alkyl group; each $R^3$ independently is H, F, methyl, or fluoro-substituted methyl; and n is 0, 1, 2, 3, or 4. Optionally, the solvent can include a co-solvent such as an ether, a carbonate ester, a nitrile, a sulfoxide, a sulfone or a combination of two or more thereof. In some embodiments, the co-solvent and solvent are present in the composition in a ratio of about 1:9 to about 9:1 (co-solvent:compound of Formula (I)). The electrolytes described herein include, for example a fluoro-substituted ether of Formula (I), such as a 2,2,2-trifluoroethyl ether-capped glycol compound of the formula: $CF_3CH_2$—(O—$CH_2CH_2$)n-$OCH_2CF_3$ in which n is 1, 2, 3, or 4, and the like.

In some embodiments, the lithium salt component of the electrolyte comprises LiTFSI, lithium 2-trifluoromethyl-4,5-dicyanoimidazole, lithium trifluoromethanesulfonate (LiTf), lithium perchlorate ($LiClO_4$), lithium bis(oxalato)borate (LiBOB), lithium difluoro(oxalato)borate (LiDFOB), lithium nitrate, other lithium salts commonly used in lithium batteries, and combinations of two or more such salts. The fluoro-substituted ether can be combined with a conventional non-aqueous lithium battery co-solvent, such as an ether (e.g., tetrahydrofuran (THF), dimethoxyethane (DME, glyme), dioxolane (DOL), diglyme, triglyme, tetraglyme, and the like), a carbonate ester (e.g., ethylene carbonate (EC), propylene carbonate (PC), ethylmethylcarbonate (EMC), dimethyl carbonate (DMC), diethyl carbonate (DEC), and the like), a nitrile (e.g., acetonitrile), a sulfoxide (e.g., dimethylsulfoxide), a sulfone (e.g., tetramethylenesulfone (TMS), ethylmethylsulfone, and the like), or other solvents commonly used in lithium ion battery systems (e.g., ionic liquids). Typically the salt is present in the solvent at a concentration in the range of about 0.1 M to about 1.2 M.

DETAILED DESCRIPTION

Fluoro-substituted glycol ethers are described herein, which are useful as additives or solvents in electrolytes for lithium ion batteries (e.g., lithium-sulfur batteries). The fluoro-substituted ethers are represented by Formula (I):

(I)

wherein $R^1$ is a fluoro-substituted $C_2$-$C_6$ alkyl group; $R^2$ is a $C_2$-$C_6$ alkyl group or a fluoro-substituted $C_2$-$C_6$ alkyl group; each $R^3$ independently is H, F, methyl, or fluoro-substituted methyl; and n is 0, 1, 2, 3, or 4. In some embodiments $R^1$ and/or $R^2$ is a fluoro-substituted $C_2$-$C_6$ alkyl group comprising at least one methylene ($CH_2$) or methine (CH) group. In other embodiments, $R^1$ and/or $R^2$ is a perfluoro $C_2$-$C_4$ alkyl group. As non-limiting examples, the fluoro-substituted ether of Formula (I) can comprise one or more of 1,1,1,11,11,11-hexafluoro-3,6,9-trioxaundecane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), 1,1,1-trifluoro-3,6,9-trioxadecane (1-FDG), and 1,1,1,2,2,12,12,13,13,13-decafluoro-4,7,10-trioxatridecane (2-FDG).

An electrolyte composition comprises a lithium salt dissolved in a solvent comprising one or more compounds of Formula (I), optionally in combination with a co-solvent.

Figure 1:
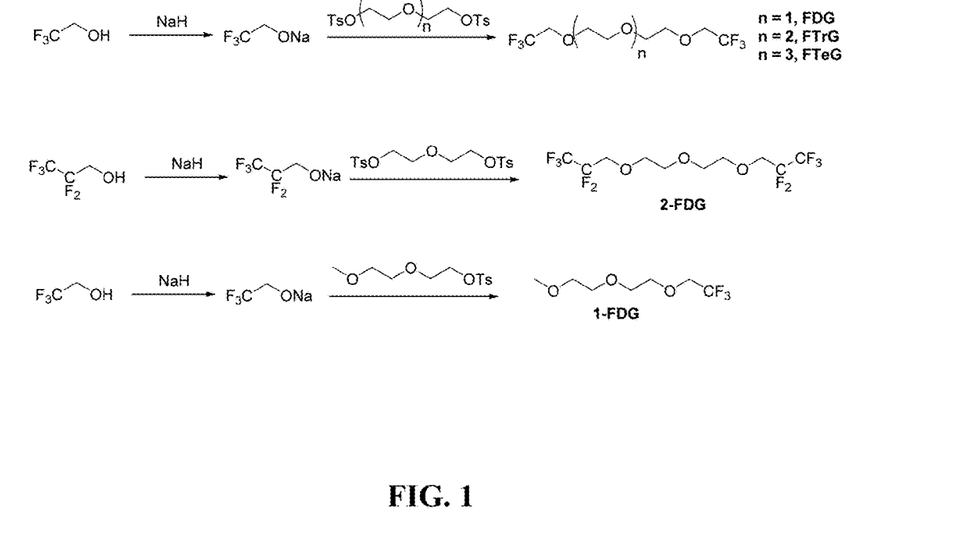
FIG. 1 provides a synthetic Scheme for preparing five representative fluoro-substituted ethers useful in electrolytes for lithium-sulfur batteries.
Figure 2:
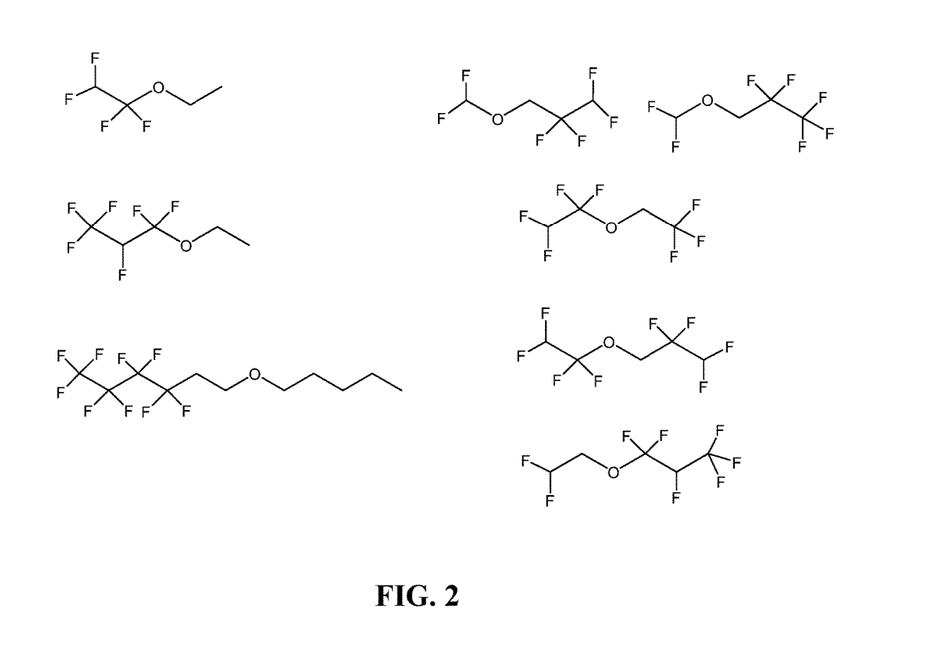
FIG. 2 illustrates non-limiting examples of fluoro-substituted ether compounds useful in electrolytes for lithium-sulfur batteries.
Figure 3:
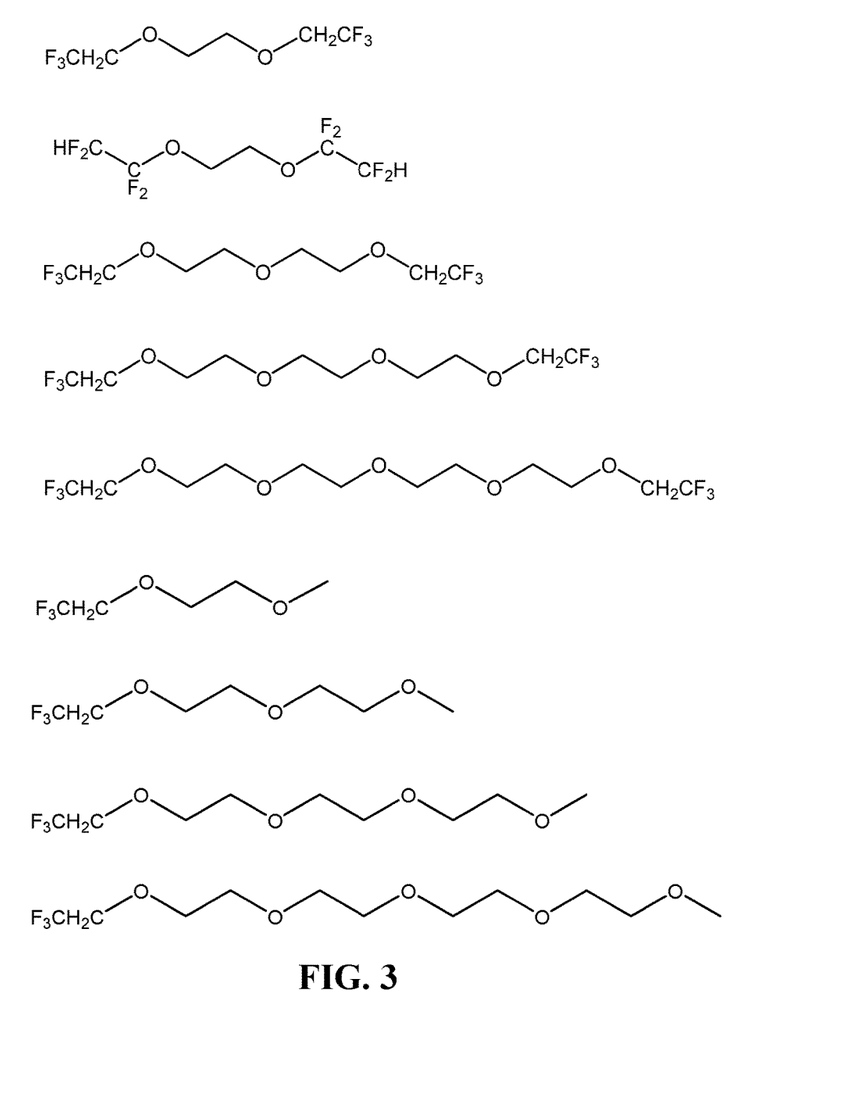
FIG. 3 illustrates non-limiting examples of fluoro-substituted glycol ether compounds useful in electrolytes for lithium-sulfur batteries.

FIG. 1 provides a synthetic Scheme for preparing five representative fluoro-substituted ethers, i.e., FDG, FtrG, FTeG, 2-FDG, and 1-FDG. FIG. 2 and FIG. 3 provide some specific, non-limiting examples of useful fluoro-substituted ether compounds (FIG. 2) and fluoro-substituted glycol ether compounds (FIG. 3).

Figure 4:
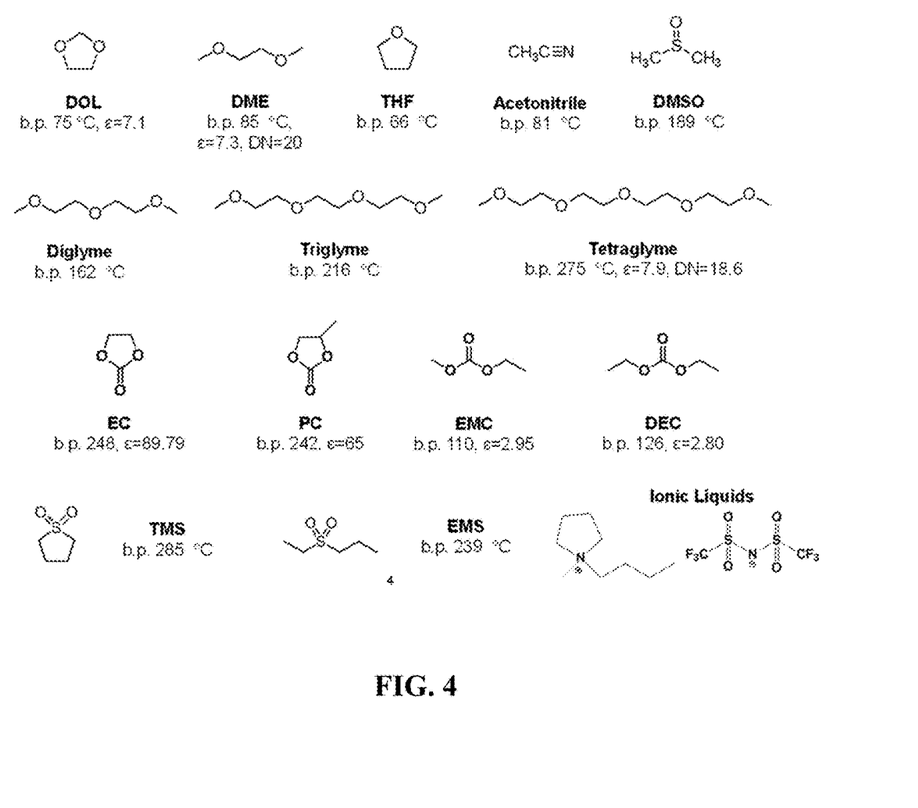
FIG. 4 illustrates non-limiting examples of co-solvents for use with the compounds of Formula (I) in lithium battery electrolytes.

FIG. 4 illustrates non-limiting examples of co-solvents for use with the compounds of Formula (I) in lithium battery electrolytes, e.g., ethers such as tetrahydrofuran (THF), dimethoxyethane (DME, glyme), dioxolane (DOL), diglyme, triglyme, and tetraglyme, carbonate esters such as ethylene carbonate (EC), propylene carbonate (PC), ethylmethylcarbonate (EMC), and diethyl carbonate (DEC); nitriles such as acetonitrile; sulfoxides such as dimethylsulfoxide (DMSO), sulfones such as tetramethylenesulfone (TMS), and ethylmethylsulfone; and ionic liquids. Other useful co-solvents include, e.g., 2-ethoxyethyl ether (EEE), poly ethylene glycol dimethyl ether (PEGDME), and similar ether compounds. In some preferred embodiment, the solvent comprises a compound of Formula (I) in combination with dioxolane (DOL). In the electrolyte composition described herein co-solvent and the compound of Formula (I) are present in the solvent mixture in a respective volume:volume (v/v) ratio in the range of about 1:9 to about 9:1, more preferably in the range of about 1:3 to about 3:1 (co-solvent:compound of Formula (I)).

Non-limiting examples of lithium salts useful in the electrolyte compositions described herein include, e.g., lithium bis(trifluoromethane)sulfonimidate (LiTFSI), lithium 2-trifluoromethyl-4,5-dicyanoimidazolate (LiTDI), lithium 4,5-dicyano-1,2,3-triazolate (LiTDI), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LIFSI), lithium bis(pentafluoroethyl sulfonyl)imidate (LBETI), lithium tetracyanoborate (LiB(CN)$_4$), lithium nitrate, combinations of two or more thereof, and the like. In some preferred embodiment, the lithium salt comprises lithium nitrate in combination with at least one other salt, e.g., LiTFSI. The lithium salt preferably is present in the solvent at a concentration in the range of about 0.1 to about 1.2 molar, more preferably about 0.8 to about 1.0 molar.

Figure 5:
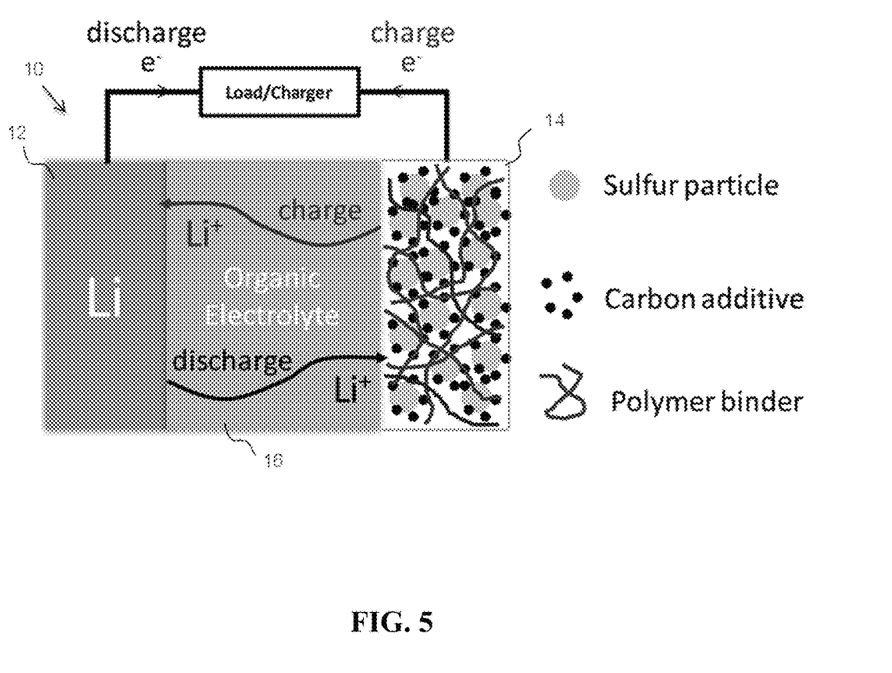
FIG. 5 schematically illustrates a rechargeable Li—S battery.

FIG. 5 schematically illustrates a rechargeable Li—S battery 10 comprising a lithium anode 12, a sulfur-containing cathode 14 comprising sulfur, carbon and a polymeric binder, and an electrolyte 16 comprising lithium ions in the solvent comprising the compound of Formula (I). The problems with conventional Li—S, discussed above (e.g., solubilization of the sulfur in the cathode, and redox shuttling), can be partially mitigated by including lithium nitrate in a conventional electrolyte solution of LiTFSI in a mixture of dioxolane and dimethoxy ethane; however, cell capacity still fades rapidly with cycling. Including the fluoro-substituted ether compounds of Formula (I) described herein as a component of the electrolyte, on the other hand, provides both unexpectedly high Coulombic efficiency and unexpectedly improved capacity retention compared to conventional electrolytes, including those with lithium nitrate as an additive.

EXAMPLES

Definition of Acronyms and Abbreviations

DOL: 1,3-dioxolane.
DME: 1,2-dimethoxyethane.
LiTFSI: lithium bis(trifluoromethanesulfonyl)imide.
RST121: sulfur electrode.
RSI144; sulfur electrode.
FGE: fluorinated glycol ethers.
FDG: 1,1,1-trifluoro-2-(2-(2-(2,2,2-trifluoroethoxy)ethoxy)ethoxy)ethane, alternatively named 1,1,1,11,11,11-hexafluoro-3,6,9-trioxaundecane.
FTrG: 1,1,1,14,14,14-hexafluoro-3,6,9,12-tetraoxatetradecane.
FTriG: same as FTrG.
FTeG: 1,1,1,17,17,17-hexafluoro-3,6,9,12,15-pentaoxaheptadecane.
1-FDG: 1,1,1-trifluoro-2-(2-(2-methoxyethoxy)ethoxy)ethane, alternatively named 1,1,1-trifluoro-3,6,9-trioxadecane.
2-FDG: 1,1,1,2,2-pentafluoro-3-(2-(2-(2,2,3,3,3-pentafluoropropoxy)ethoxy) ethoxy) propane, alternatively named 1,1,1,2,2,12,12,13,13,13-decafluoro-4,7,10-trioxatridecane.

Synthesis Procedures

FIG. 1 illustrates synthetic routes for three representative fluoro-substituted ether compounds of Formula (I). Synthetic procedures for preparing the compounds of Formula (I) and electrochemical evaluations thereof in Li—S batteries are illustrated by the following Examples.

Example 1

Synthesis of 1,1,1-trifluoro-2-(2-(2-(2,2,2-trifluoroethoxy)ethoxy)ethoxy) ethane (FDG):

2,2,2-Trifluoroethanol (14.5 g, 2.4 equiv.) was added drop-wise to a mixture of sodium hydride (60% in mineral oil, 9.7 g, 4 equiv.) and tetrahydrofuran (THF, 200 mL) at 0° C. via syringe pump under $N_2$ atmosphere. The resulting mixture was allowed to stir for 2 h at room temperature. Oxybis(ethane-2,1-diyl) bis(4-methylbenzenesulfonate) (25 g, 1 equiv.) dissolved in 100 mL THF was then added drop-wise to the resulting alkoxide solution at 0° C. The resulting solution was refluxed for 8 h and then quenched with water. The reaction mixture was then extracted by 80 mL ethyl acetate (3 times) and the combined organic phase was washed with brine and dried over anhydrous $Na_2SO_4$. After the removal of solvent by a rotary evaporator, the crude product was dried over 4 Å molecular sieves and then purified by fractional distillation. The final product (b.p.: 67° C., 8 mmHg) is a colorless liquid (7.92 g) with a yield of 49%. $^1$H NMR (CDCl$_3$, 300 MHz): δ 3.88 (q, 4H, 8.7 Hz), 3.71 (m, 8H); $^{13}$C NMR (CDCl$_3$, 75 MHz): δ 129.5, 125.8, 122.1, 118.4 (q, 278 Hz), 78.9, 70.7, 69.4, 68.9, 68.5, 68.0 (q, 34 Hz).

Example 2

Synthesis of 1,1,1,14,14,14-hexafluoro-3,6,9,12-tetraoxatetradecane (FTrG):

2,2,2-Trifluoroethanol (13.1 g, 2.4 equiv.) was added drop-wise to a mixture of sodium hydride (60% in mineral oil, 8.7 g, 4 equiv.) and 200 mL tetrahydrofuran (THF) at 0° C. via syringe pump under $N_2$ atmosphere. The resulting mixture was allowed to stir for 2 h at room temperature. (Ethane-1,2-diylbis(oxy))bis(ethane-2,1-diyl) bis(4-methylbenzenesulfonate) (25 g, 1 equiv.) dissolved in 100 mL THF was then added drop-wise to the resulting alkoxide solution at 0° C. After which the resulting solution was refluxed for 8 h and then quenched by adding water. The reaction mixture was extracted by 80 mL ethyl acetate (3 times) and the combined organic phase was washed with brine and dried over anhydrous $Na_2SO_4$. After the removal of solvent by a rotary evaporator, the crude product was dried over 4 Å molecular sieves and then purified by fractional distillation. The final product (b.p.: 96° C., 8 mmHg) is a colorless liquid (9.98 g) with a yield of 58%. $^1$H NMR (CDCl$_3$, 300 MHz): δ 3.89 (q, 4H, 8.9 Hz), 3.71 (m, 12H); $^{13}$C NMR (CDCl$_3$, 75 MHz): δ 129.5, 125.8, 122.1, 118.4 (q, 278 Hz), 71.8, 70.6, 70.6, 69.3, 68.9, 68.4, 68.0 (q, 34 Hz).

Example 3

Synthesis of 1,1,1,17,17,17-hexafluoro-3,6,9,12,15-pentaoxaheptadecane (FTeG):

2,2,2-Trifluoroethanol (11.9 g, 2.4 equiv.) was added drop-wise to a mixture of sodium hydride (60% in mineral oil, 8.0 g, 4 equiv.) and 200 mL tetrahydrofuran (THF) at 0° C. via syringe pump under $N_2$ atmosphere. The resulting mixture was allowed to stir for 2 h at room temperature. ((Oxybis(ethane-2,1-diyl))bis(oxy))bis(ethane-2,1-diyl) bis(4-methylbenzenesulfonate) (25 g, 1 equiv.) dissolved in 100 mL THF was then added drop-wise to the resulting alkoxide solution at 0° C. The resulting solution was refluxed for 8 h and then quenched by adding water. The reaction mixture was extracted by 80 mL ethyl acetate (3 times) and the combined organic phase was washed with brine and dried over anhydrous $Na_2SO_4$. After the removal of solvent by a rotary evaporator, the crude product was dried over 4 Å molecular sieves and then purified by fractional distillation. The final product (b.p.: 129° C., 8 mmHg) is a colorless liquid (7.90 g) with a yield of 44%. $^1$H NMR (CDCl$_3$, 300 MHz): δ 3.89 (q, 4H, 8.8 Hz), 3.76 (m, 4H), 3.65 (m, 12H); $^{13}$C NMR (CDCl$_3$, 75 MHz): δ 129.5, 125.8, 122.1, 118.4 (q, 278 Hz), 71.8, 70.6, 70.5, 70.5, 69.3, 68.8, 68.4, 67.9 (q, 34 Hz).

Example 4

Synthesis of 1,1,1,2,2-pentafluoro-3-(2-(2-(2,2,3,3,3-pentafluoropropoxy) ethoxy)ethoxy)-Propane (2-FDG)

2,2,3,3,3-Pentafluoropropan-1-ol (21.7 g, 2.4 equiv.) was added drop-wise to a mixture of sodium hydride (60% in mineral oil, 9.7 g, 4 equiv.) and tetrahydrofuran (THF, 200 mL) at 0° C. via syringe pump under $N_2$ atmosphere. The resulting mixture was allowed to stir for 2 h at room temperature. (Ethane-1,2-diylbis(oxy))bis(ethane-2,1-diyl) bis(4-methylbenzenesulfonate) (25 g, 1 equiv.) dissolved in 100 mL THF was then added dropwise to the resulting alkoxide solution at 0° C. Then, the resulting solution was refluxed for 8 h and then quenched with water. The reaction mixture was extracted by 80 mL ethyl acetate (3 times) and the combined organic phase was washed with brine and dried over anhydrous $Na_2SO_4$. After the removal of solvent by a rotary evaporator, the crude product was dried over 4 Å molecular sieves and then purified by fractional distillation. The final product (b.p.: 75° C., 8 mmHg) is a colorless liquid (11.72 g) with a yield of 52%. $^1$H NMR (CDCl$_3$, 300 MHz): δ 3.98 (qt, 4H, 13 Hz, 0.3 Hz), 3.72 (m, 8H); $^{13}$C NMR (CDCl$_3$, 75 MHz): δ 118.7 (tq, 284 Hz, 35 Hz), 113.1 (qt, 253 Hz, 37 Hz), 72.2, 70.7, 67.9 (t, 26 Hz).

Example 5

Synthesis of 1,1,1-trifluoro-2-(2-(2-methoxyethoxy) ethoxy)ethane (1-FDG)

2,2,2-Trifluoroethanol (13.5 g, 1.2 equiv.) was added drop-wise to a mixture of sodium hydride (60% in mineral oil, 9.0 g, 2 equiv.) and tetrahydrofuran (THF, 200 mL) at 0° C. via syringe pump under $N_2$ atmosphere. The resulting mixture was allowed to stir for 2 h at room temperature. 2-(2-Methoxyethoxy)ethyl 4-methylbenzenesulfonate (30.8 g, 1 equiv.) dissolved in 100 mL THF was then added drop-wise to the resulting alkoxide solution at 0° C. The resulting solution was refluxed for 8 h and then quenched by adding water. The reaction mixture was extracted by 80 mL ethyl acetate (3 times) and the combined organic phase was washed with brine and dried over anhydrous $Na_2SO_4$. After the removal of solvent by a rotary evaporator, the crude product was dried over 4 Å molecular sieves and then purified by fractional distillation. The final product (b.p.: 49° C., 8 mmHg) is a colorless liquid (11.09 g) with a yield of 49%. $^1$H NMR (CDCl$_3$, 300 MHz): δ 3.87 (q, 2H, 8.8 Hz), 3.62 (m, 8H), 3.34 (s, 3H); $^{13}$C NMR (CDCl$_3$, 75 MHz): δ 129.5, 125.8, 122.1, 118.4 (q, 278 Hz), 71.8, 71.7, 70.5, 69.2, 68.8, 68.3, 67.9 (q, 34 Hz).

Example 6

Sulfur Electrode Fabrication

S electrodes were prepared by mixing 60 wt % of the sulfur, 30 wt % carbon black (Super-P), and 20 wt % poly(vinylidene difluoride) (PVDF) dissolved in 1-methyl-2-pyrrolidinone (NMP) to form a homogeneous slurry. The slurry was then coated onto an aluminum foil current collector. The coated electrodes were dried at 60° C. under vacuum for 12 h and punched into discs with an area of 1.53 cm$^2$. The electrodes contain 60 wt % sulfur with a loading of 1.5 mg cm$^2$.

Example 7

Electrolyte Preparation 1,2-Dimethoxyethane (DME) and 1,3-dioxolane (DOL) were purchased from Sigma-Aldrich. All solvents were dried with activated molecular sieves for overnight and purified by distillation prior use. Lithium bis(trifluoromethanesulfonyl)imide (LiTFSI) was purchased from Sigma-Aldrich and dried in a vacuum oven for overnight before use. Fluorinated ethers of Formula (I), e.g., fluorinated glycol ethers (FGE), were synthesized and purified according to the procedures described below. The electrolytes tested in this study were prepared by dissolving (1) 1.0 M LiTFSI in DOL/DME (v/v=1:1) and (2) 1.0 M LiTFSI in DOL/FGE with various volume ratios (2:1, 1:1, 1:2, and 1:3). Complete dissolution of LiTFSI was achieved with all the solvent combinations.

Example 8

Electrochemical Evaluation 2032 coin cells were assembled with lithium metal as the anode and the above-made sulfur electrode as cathode. The cells were assembled in an Ar-filled glove-box and cycled with C/10 (1C=1675 mAhg$^{-1}$) current on a MACCOR series 4000 cycler with a 1.6-2.8 V voltage range.

Results.

Figure 6:
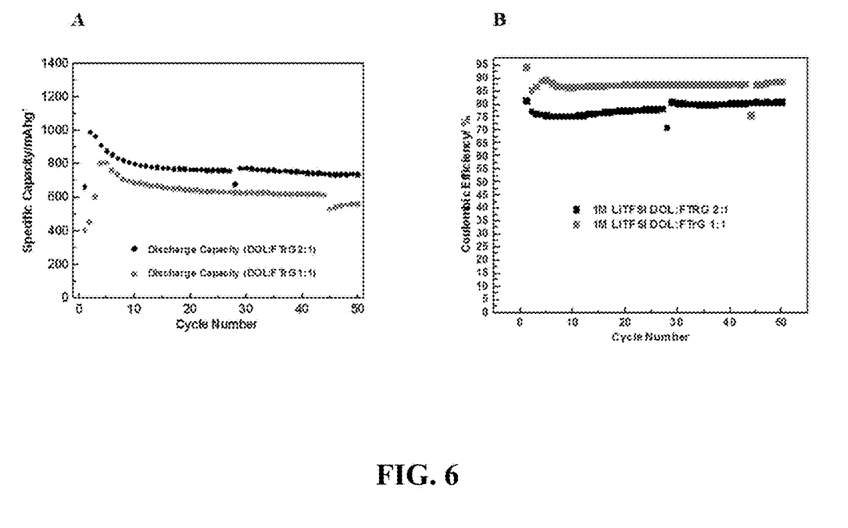
FIG. 6 provides (a) a plot of Specific Capacity vs. cycle number and (b) a plot of Coulombic Efficiency vs. Cycle Number, for Li—S cells comprising 1M LiTFSI in 2:1 (v/v) DOL:FTrG and 1:1 (v/v) DOL:FTrG.

FIG. 6 provides (a) a plot of Specific Capacity vs. cycle number and (b) a plot of Coulombic Efficiency vs. Cycle Number, for Li—S cells comprising 1M LiTFSI in 2:1 (v/v) DOL:FTrG and 1:1 (v/v) DOL:FTrG. The data show improved capacity retention and high Coulombic efficiency relative to similar electrolyte compositions lacking the fluoro-substituted ether compound.

Figure 7:
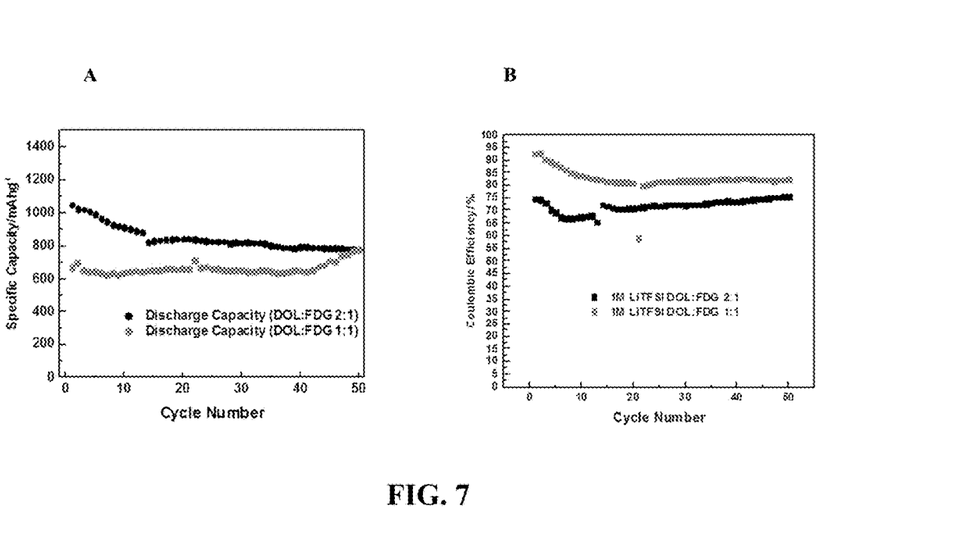
FIG. 7 provides (a) a plot of Specific Capacity vs. Cycle Number and (b) a plot of Coulombic Efficiency vs. cycle number, for Li—S cells comprising 1M LiTFSI in 2:1 (v/v) DOL:FDG and 1:1 (v/v) DOL:FDG.
Figure 8:
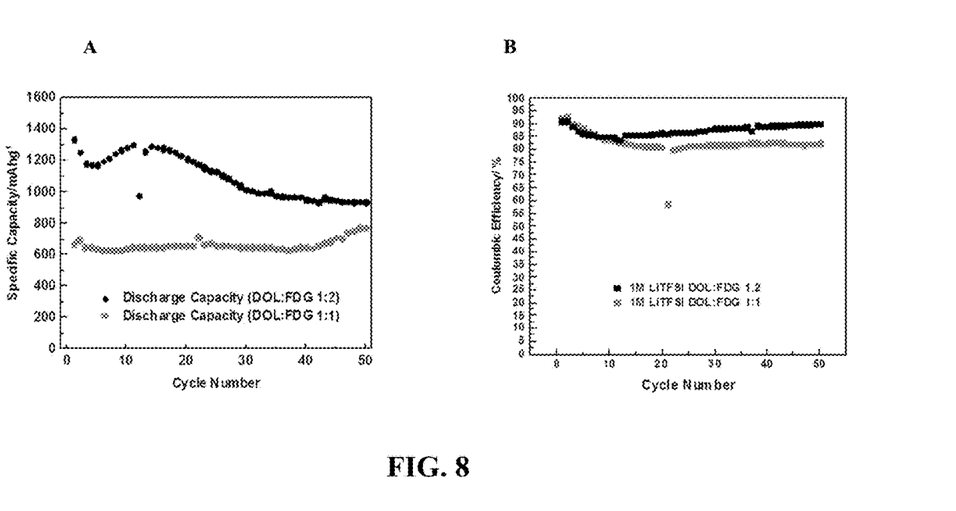
FIG. 8 provides (a) a plot of Specific Capacity vs. Cycle Number and (b) a plot of Coulombic Efficiency vs. cycle number, for Li—S cells comprising 1M LiTFSI in 1:2 (v/v) DOL:FDG and 1:1 (v/v) DOL:FDG.

FIG. 7 provides (a) a plot of Specific Capacity vs. Cycle Number and (b) a plot of Coulombic Efficiency vs. cycle number, for Li—S cells comprising 1M LiTFSI in 2:1 (v/v) DOL:FDG and 1:1 (v/v) DOL:FDG. The data show high capacity, improved capacity retention and high Coulombic efficiency relative to similar electrolyte compositions lacking the fluoro-substituted ether compound. FIG. 8 provides (a) a plot of Specific Capacity vs. Cycle Number and (b) a plot of Coulombic Efficiency vs. cycle number, for Li—S cells comprising 1M LiTFSI in 1:2 (v/v) DOL:FDG and 1:1 (v/v) DOL:FDG. The data in FIG. 7 and FIG. 8 show high capacity, improved capacity retention and high Coulombic efficiency relative to similar electrolyte compositions lacking the fluoro-substituted ether compound. Higher concentration of FDG provided higher Coulombic efficiency.

Figure 9:
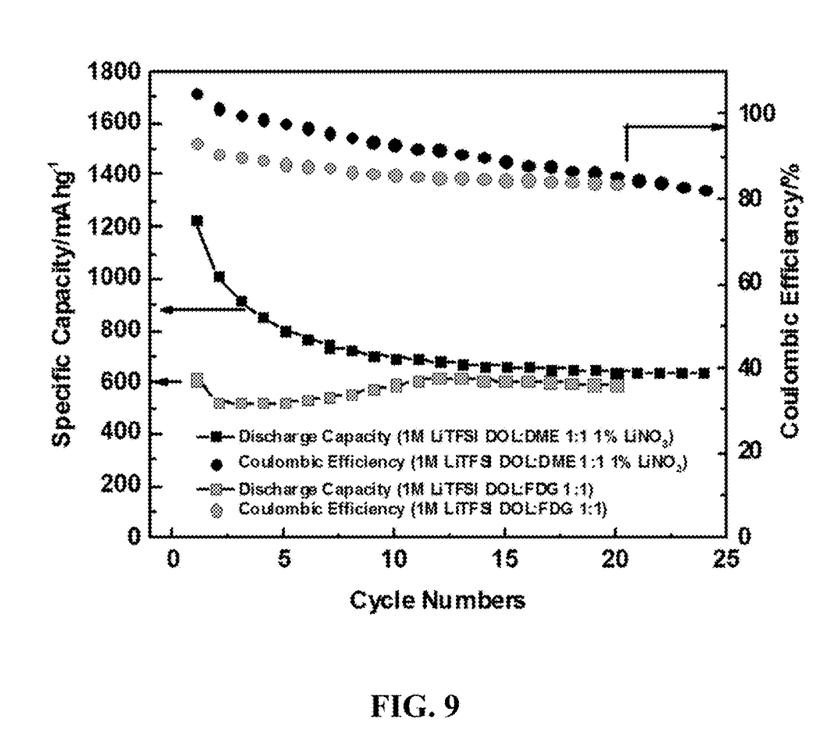
FIG. 9 provides a plots of Specific Capacity vs. Cycle Number and Coulombic Efficiency vs. Cycle Number for Li—S cells comprising 1M LiTFSI in a conventional solvent (1:1 (v/v) DOL:DME) containing 1% lithium nitrate as an additive, and a solvent comprising 1:1 (v/v) DOL:FDG without added lithium nitrate.

FIG. 9 provides a plots of Specific Capacity vs. Cycle Number and Coulombic Efficiency vs. Cycle Number for Li—S cells comprising 1M LiTFSI in a conventional solvent (1:1 (v/v) DOL:DME) containing 1% lithium nitrate as an additive, and a solvent comprising 1:1 (v/v) DOL:FDG without added lithium nitrate. The results in FIG. 9 show that lithium nitrate improved the initial coulombic efficiency (CE), by CE decreased drastically as lithium nitrate was consumed. In contrast, the FDG-containing electrolyte provided excellent CE and capacity retention with significantly less drop in CE upon subsequent cycling relative to the conventional electrolyte system with added lithium nitrate.

As shown in the experimental results, the fluorination of glycol ethers can significantly improve the electrochemical performance of the lithium-sulfur cell compared to their non-fluorinated counterparts. The lithium-sulfur cell employing an electrolyte with 1 M LiTFSI in a mixture of DOL and FDG (1,1,1-trifluoro-2-(2-(2-(2,2,2-trifluoroethoxy)ethoxy)ethoxy)ethane) demonstrated superior cycling performance and enhanced coulombic efficiency compared to the cell using the conventional electrolyte (1 M LiTFSI in DOL/DME).

Figure 10:
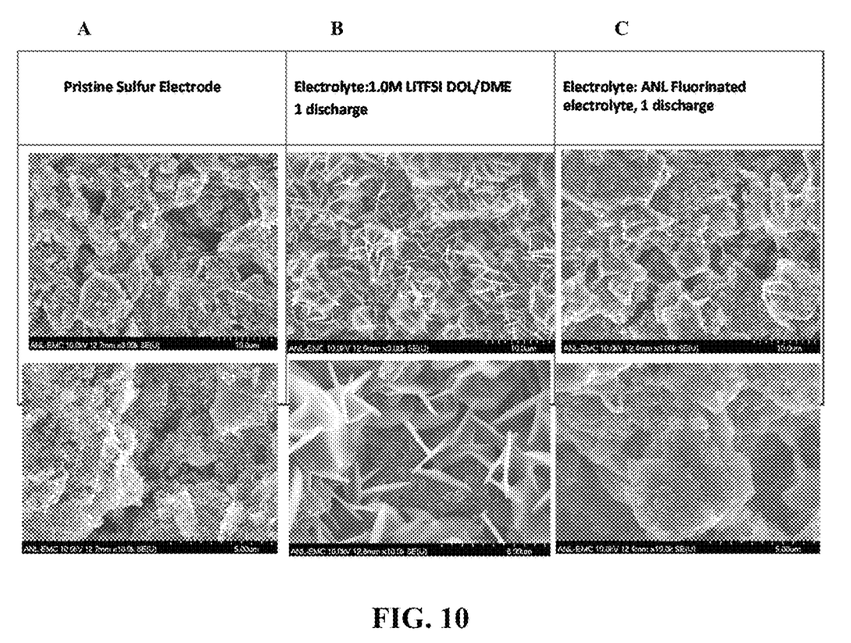
FIG. 10 shows scanning electron micrograph (SEM) images of the surface of sulfur electrodes after one discharge in an electrolyte without (B) and with (C) a fluoro-substituted ether compound of Formula (I), compared to the pristine electrode surface (A) prior to any discharge.

It is believed that at least some of the benefits of the fluoro-substituted ether compounds of Formula (I) are that they aid in preserving the morphology of the sulfur electrode (e.g., by inhibiting dissolution of sulfur). This is borne out by micrographic evaluations of sulfur electrodes which show that in the absence of a fluoro-substituted ether compound of Formula (I), the sulfur electrode morphology changes significantly after one discharge, whereas an electrolyte containing a fluoro-substituted ether compound of Formula (I) substantially preserved the morphology of the electrode surface (See FIG. 10).

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A lithium-sulfur battery comprising a positive electrode, a negative electrode, and an electrolyte therebetween; wherein the positive electrode comprises sulfur, the negative electrode comprises lithium, and the electrolyte comprises a lithium salt dissolved in a solvent comprising one or more fluoro-substituted ether compound selected from the group consisting of:

1,1,1,11,11,11-hexafluoro-3,6,9-trioxaundecane, 1,1,1,14,14,14-hexafluoro-3,6,9,12-tetraoxatetradecane, 1,1,1,17,17,17-hexafluoro-3,6,9,12,15-pentaoxaheptadecane, and 1,1,1,2,2,12,12,13,13,13-decafluoro-4,7,10-trioxatridecane.

2. The lithium-sulfur battery of claim 1, wherein the solvent further comprises a co-solvent selected from one or more of an ether, a carbonate ester, a nitrile, a sulfoxide, and a sulfone.

3. The lithium-sulfur battery of claim 2, wherein the co-solvent comprises one or more ether selected from dioxolane, tetrahydrofuran, dimethoxyethane, diglyme, triglyme, and tetraglyme.

4. The lithium-sulfur battery of claim 2, wherein the co-solvent comprises one or more carbonate ester selected from ethylene carbonate, propylene carbonate, dimethyl carbonate, diethyl carbonate, and ethylmethyl carbonate.

5. The lithium-sulfur battery of claim 2, wherein the co-solvent and the fluoro-substituted ether compound are present in the solvent mixture in a respective volume ratio in the range of about 1:9 to about 9:1.

6. The lithium-sulfur battery of claim 1, wherein the lithium salt comprises one or more of lithium bis(trifluoromethane)sulfonimidate (LiTFSI), lithium 2-trifluoromethyl-4,5-dicyanoimidazolate (LiTDI), lithium 4,5-dicyano-1,2,3-triazolate (LiTDI), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LIFSI), lithium bis(pentafluoroethylsulfonyl)imidate (LBETI), lithium tetracyanoborate (LiB(CN)$_4$), and lithium nitrate.

7. The lithium-sulfur battery of claim 1, wherein the lithium salt comprises lithium bis(trifluoromethane)sulfonimidate.

8. The lithium-sulfur battery of claim 1, wherein the lithium salt is present in the solvent at a concentration in the range of about 0.1 to about 1.2 molar.

9. The lithium-sulfur battery of claim 1, wherein the positive electrode comprises particles of sulfur and particles of carbon held together with a binder.

10. The lithium-sulfur battery of claim 9, wherein the particles of carbon comprise carbon black.

11. The lithium-sulfur battery of claim 9, wherein the negative electrode comprises lithium metal.

12. The lithium-sulfur battery of claim 1, wherein the positive electrode comprises a mixture of about 60 wt % of sulfur particles, 30 wt % of carbon black particles, and 20 wt % of poly(vinylidene difluoride) (PVDF) binder.

13. The lithium-sulfur battery of claim 12, wherein the negative electrode comprises lithium metal.

* * * * *